(12) United States Patent
Plenderleith et al.

(10) Patent No.: US 11,875,191 B1
(45) Date of Patent: Jan. 16, 2024

(54) ENERGY-OPTIMIZING PLACEMENT OF RESOURCES IN DATA CENTERS

(71) Applicant: Amazon Technologies, Inc., Seattle, WA (US)

(72) Inventors: Jamie Plenderleith, Dublin (IE); Brian Hayward, Seattle, WA (US); Monika Marta Gnyp, Maynooth (IE); Sarah Rose Quigley, Dublin (IE); Suzie Cuddy, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 72 days.

(21) Appl. No.: 16/806,428

(22) Filed: Mar. 2, 2020

(51) Int. Cl.
G06F 9/50 (2006.01)
H04W 64/00 (2009.01)
H04L 67/10 (2022.01)

(52) U.S. Cl.
CPC .......... *G06F 9/5072* (2013.01); *G06F 9/5027* (2013.01); *G06F 9/5077* (2013.01); *G06F 9/5094* (2013.01); *H04L 67/10* (2013.01); *H04W 64/003* (2013.01)

(58) Field of Classification Search
CPC ...... G06F 3/061; G06F 3/0664; G06F 3/0665; G06F 3/067; G06F 3/0685; G06F 9/45558; G06F 13/4022; G06F 13/4265; G06F 2009/45579; G06F 2009/45595; H04L 67/1097; H04L 67/1002
USPC ........................................................ 709/212
See application file for complete search history.

(56) References Cited

U.S. PATENT DOCUMENTS

| 10,277,523 | B2 | 4/2019 | Wu et al. |
| 10,437,636 | B2 | 10/2019 | Mageale et al. |
| 10,492,340 | B1 | 11/2019 | Kowalski et al. |
| 10,558,256 | B2 | 2/2020 | Franke et al. |
| 10,558,768 | B1 | 2/2020 | Weber et al. |

(Continued)

FOREIGN PATENT DOCUMENTS

EP    2098942 A1 *  9/2009  ............. G06F 1/206

OTHER PUBLICATIONS

U.S. Appl. No. 16/367,862, filed Mar. 28, 2019, Malcolm Featonby.

(Continued)

*Primary Examiner* — Tan Doan
(74) *Attorney, Agent, or Firm* — Robert C. Kowert; Kowert, Hood, Munyon, Rankin & Goetzel, P.C.

(57) ABSTRACT

Methods, systems, and computer-readable media for energy-optimizing placement of resources in data centers are disclosed. A resource placement manager determines information descriptive of energy usage by one or more data centers. The one or more data centers comprise a plurality of computing resources in a plurality of corresponding locations. The resource placement manager selects, from the plurality of computing resources in the plurality of corresponding locations, a particular computing resource in a particular location for performing one or more computing tasks. The particular computing resource in the particular location is selected based at least in part on reducing energy usage associated with the one or more data centers according to the information descriptive of energy usage. The particular computing resource in the particular location is used to perform the one or more computing tasks.

20 Claims, 9 Drawing Sheets

(56) References Cited

U.S. PATENT DOCUMENTS

| | | | |
|---|---|---|---|
| 10,573,273 B2 | 2/2020 | Huberman et al. | |
| 2009/0228893 A1* | 9/2009 | Behrendt | G06F 1/206 |
| | | | 718/105 |
| 2010/0057641 A1* | 3/2010 | Boss | G06Q 10/06 |
| | | | 705/412 |
| 2013/0073245 A1* | 3/2013 | Bhagwat | H05K 7/20836 |
| | | | 702/130 |
| 2013/0166241 A1* | 6/2013 | Hamann | G06Q 10/06 |
| | | | 702/99 |
| 2013/0286579 A1* | 10/2013 | De Spiegeleer | G06F 3/0665 |
| | | | 361/679.33 |
| 2017/0264493 A1* | 9/2017 | Cencini | H04L 67/1012 |

OTHER PUBLICATIONS

Tiffany Jernigan, "Amazon ECS Task Placement", AWS Compute Blog, Retrieved from https://aws.amazon.com/blogs/compute/amazon-ecs-task-placement/, Jan. 2, 2019, pp. 1-14.

Roshni Pary, "Using partition placement groups for large distributed and replicated workloads in Amazon EC2", AWS Compute Blog, Retrieved from https://aws.amazon.com/blogs/compute/using-partition-placement-groups-for-large-distributed-and-replicated-workloads-in-amazon-ec2/, Apr. 22, 2019, pp. 1-5.

* cited by examiner

1

ENERGY-OPTIMIZING PLACEMENT OF RESOURCES IN DATA CENTERS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

Figure 1:
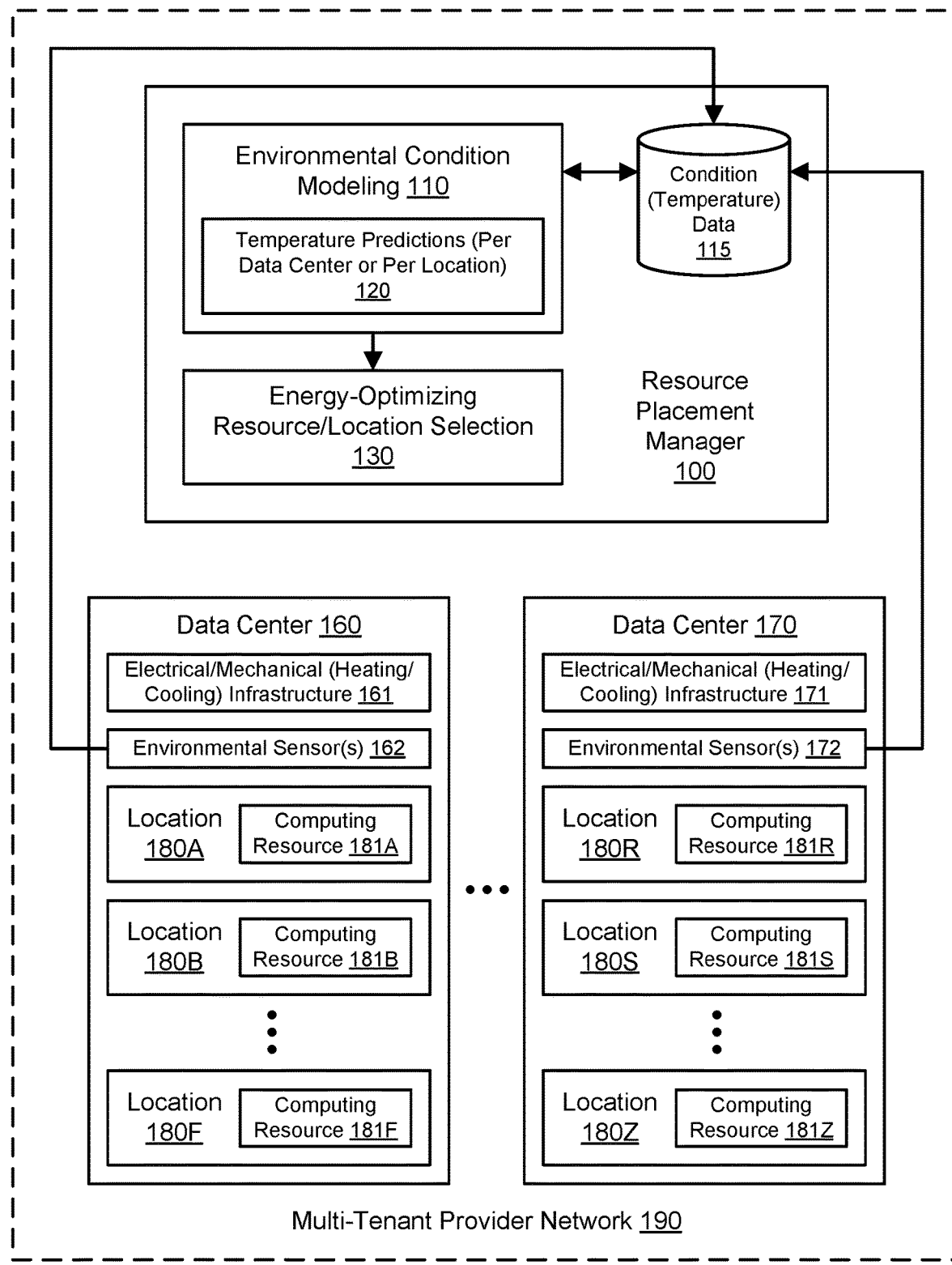
FIG. 1 illustrates an example system environment for energy-optimizing placement of resources in data centers, including selection of resource locations to reduce energy usage, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for energy-optimizing placement of resources in data centers are described. A multi-tenant provider network (also referred to as a cloud provider network) may provide convenient, on-demand network access to a shared pool of configurable computing resources that can be programmatically provisioned and released in response to customer commands. These resources can be dynamically provisioned and reconfigured to adjust to variable load. The provider network may include one or more data center facilities. When customers of the cloud provider network request to launch a resource, the cloud provider may use a placement service to determine which data center, and which server in that data center, should be used to launch the resource. In addition to hosting a set of computing resources, each data center may have its own power, networking, and electrical/mechanical (heating/cooling) infrastructure. The use of computing resources at a particular data center (e.g., to execute customer-specified tasks) may affect the use of the electrical/mechanical infrastructure or affect other power consumption at the data center. For example, some tasks may generate more heat than others (e.g., by taxing CPU resources, GPU resources, storage resources, etc.), and that heat may require increased use of the cooling infrastructure at the affected data center. If jobs are assigned to computing resources in particular locations without regard to the environmental or energy impact of using those resources, then energy usage may increase. An increase in energy usage at a data center may be environmentally unfriendly and may also increase the price of operating the data center.

The aforementioned challenges, among others, are addressed by embodiments of the techniques described herein, whereby placement of computing resources or tasks may be determined using information regarding environmental conditions or electrical/mechanical infrastructure usage at data centers. A resource placement manager may model the environmental conditions at various data centers, e.g., using temperature data provided by sensors at the data centers over time. For example, using such a model, the resource placement manager may be able to predict the ambient temperature at a data center at various times of day and at various times throughout the year. When a request is received to launch a computing resource or execute a workload, a resource placement manager may select the location and/or starting time of that resource or workload in order to reduce energy usage, e.g., based on current or predicted environmental conditions (e.g., temperatures) at a set of data centers. For example, a placement decision for a computing resource may select a first data center over a second data center if the first data center is colder, thereby placing less of an additional burden on the cooling infrastructure of the hotter data center (and potentially reducing use of a heating infrastructure at the colder data center). The resource placement manager may select particular locations within data centers to reduce the concentration of active resources in "hotspots" that would require greater use of the cooling infrastructure. The resource placement manager may also time-shift workloads to reduce energy usage and cost, e.g., to run workloads that are less time-sensitive at night or at other times when the heating/cooling infrastructure will be used less. The resource placement manager may assign scores to candidate resources according to a cost function that considers electrical/mechanical efficiencies of different data centers, and the scores may be used with other criteria to determine placement. The other criteria may include, for example, extending the useful life of one or more resources by distributing workloads to other resources. By selecting locations for computing resources or tasks in view of environmental conditions or energy usage metrics at a set of data centers, the resource placement manager may reduce energy usage across the data centers.

As one skilled in the art will appreciate in light of this disclosure, embodiments may be capable of achieving certain technical advantages, including some or all of the following: (1) reducing energy usage associated with heating and cooling of data centers by selecting one data center over another data center for placement of a workload according to different environmental conditions (e.g., temperatures) of those data centers; (2) reducing energy usage within one data center by selecting one location over another location for placement of a workload in order to reduce "hotspots" that would require additional cooling; (3) reducing energy usage associated with heating and cooling of data centers by selecting a starting time for a workload according to predicted environmental conditions (e.g., temperatures) at different starting times; (4) reducing energy usage associated with operation of data centers by selecting one data center over another data center for placement of a workload according to differing electrical/mechanical efficiency metrics of those data centers; and so on.

FIG. 1 illustrates an example system environment for energy-optimizing placement of resources in data centers, including selection of resource locations to reduce energy usage, according to some embodiments. A multi-tenant provider network 190 may provide convenient, on-demand network access to a shared pool of configurable computing resources 181A-181Z that can be programmatically provisioned and released in response to customer commands. The provider network 190 may include one or more data center facilities such as data centers 160 through 170. Each data center may host a set of computing resources such as computing resources 181A and 181B through 181F at data center 160 and computing resources 181R and 181S through 181Z at data center 170. The computing resources 181A-181Z may include servers that can be configured to host virtual compute instances that can execute customer-specified tasks (also referred to as jobs or workloads). The various computing resources 181A-181Z may be placed at different locations in the data centers 160-170: computing resource 181A may be positioned at location 180A, computing resource 181B may be positioned at location 180B, computing resource 181F may be positioned at location 180F, computing resource 181R may be positioned at location 180R, computing resource 181S may be positioned at location 180S, computing resource 181Z may be positioned at location 180Z, and so on. The locations 180A-180Z may represent different areas within a data center, different racks within a data center, different positions within racks, different droplets within a data center, different slots within a droplet, and so on. The data centers 160-170 may be located in the same availability zone and/or region within the provider network 190.

Additionally, each data center may have its own power, networking, and electrical/mechanical (heating/cooling) infrastructure such as electrical/mechanical infrastructure 161 at data center 160 and electrical/mechanical infrastructure 171 at data center 170. In some embodiments, the electrical/mechanical infrastructures 161 and 171 may provide functions distinct from the operation of the computing resources 181A-181Z themselves. The electrical/mechanical infrastructures 161 and 171 may provide heating and cooling of air for the data centers 160 and 170. The electrical/mechanical infrastructures 161 and 171 may provide dehumidification for the data centers 160 and 170. The electrical/mechanical infrastructures 161 and 171 may provide air filtering to remove particulates for the data centers 160 and 170. Use of the computing resources 181A-181Z to execute computing tasks may generate heat, and the electrical/mechanical infrastructures 161 and 171 may be required to perform cooling to keep the ambient temperature within an acceptable range for continued operation of the computing resources. In some circumstances, the electrical/mechanical infrastructures 161 and 171 may use a great deal of energy at a significant financial cost for the owner or operator of the provider network 190 and with a corresponding environmental impact.

A resource placement manager 100 may select data centers or locations within data centers for execution of computing tasks in order to optimize energy usage and/or use of electrical/mechanical infrastructure at one or more of the data centers. As used herein, the terms "optimize," "optimizing," and "optimization" generally refer to achieving reductions in energy usage or other improvements in the use of electrical/mechanical infrastructure. However, because criteria other than energy usage (e.g., timing of job execution, reduction in network latency, workload performance, and so on) may also be used to determine placement of computing resources and tasks, energy usage may be improved by use of the resource placement manager 100 but may not necessarily be reduced to "optimal" or "ideal" levels. In some embodiments, the resource placement manager 100 may automatically select locations for computing resources. In some embodiments, the resource placement manager 100 may recommend selected locations to customers and permit customers to choose. Recommendations may be presented with an indication of the positive environmental impact of the selected locations.

The resource placement manager 100 may include a component for environmental condition modeling 110. The environmental condition modeling 110 may determine a predictive model of conditions at various data centers 160-170 and at various times. For example, the environmental condition modeling 110 may generate temperature predictions 120 per data center or per location within a data center. A temperature prediction for an entire data center may include the same temperature prediction for every location within that data center, or location-specific temperature predictions may be provided. The environmental condition modeling 110 may include an ETS (error, trend, seasonality) model to predict conditions that tend to follow daily and/or seasonal patterns. The environmental condition modeling 110 may use linear regression techniques. The environmental condition modeling 110 may use a variety of data sources as input. In some embodiments, environmental sensors at data centers may provide current readings for temperature, humidity, and so on at one or more locations within a given data center, and these values may be maintained as condition data 115 by the resource placement manager 100 and used in the modeling 110. For example, data center 160 may include one or more environmental sensors 162 that provide time-stamped temperature values for one or more locations within the data center, while data center 170 may include one or more environmental sensors 172 that provide time-stamped temperature values for one or more locations within the data center. The condition data 115 may include historical values as well as recent or current values for environmental conditions such as temperature, humidity, air quality, and so on. The condition data 115 may include aggregate temperature values, e.g., such that the condition data 115 includes an average temperature for each one-hour block (where data is available) at a given sensor throughout some period of days, weeks, months, or years. In some embodiments, the environmental condition modeling 110 may use weather forecasts (e.g., from sources outside the provider network 190) to generate predictions of temperatures or other environmental conditions at data centers.

The resource placement manager 100 may include a component for energy-optimizing resource/location selection 130. In some embodiments, as shown in the example of FIG. 1, the energy-optimizing resource/location selection 130 may use data (e.g., predicted temperatures 120) produced by the environmental condition modeling 110 to make placement decisions among data centers 160-170 or within a given data center. In some embodiments, the energy-optimizing resource/location selection 130 may use other condition data (e.g., current temperatures from sensors 162 and 172) to make placement decisions among data centers 160-170 or within a given data center. In some embodiments, the energy-optimizing resource/location selection 130 may be performed when a request is received from a customer of the provider network 190 to launch a computing resource, execute a workload, or schedule a workload. In some embodiments, the energy-optimizing resource/location selection 130 may be performed when a request is received to migrate a computing resource or workload that is already being executed. In some embodiments, the energy-optimizing resource/location selection 130 may be performed when sufficient conditions are detected to migrate a computing resource or workload that is already being executed. For example, if temperatures rise or drop sharply, then the resource placement manager 100 may recommend or initiate migration of workloads to optimize energy usage in light of the changing environmental conditions.

For a customer-specified workload (or set of one or more computing tasks) that requires one of the computing resources 181A-181Z, the energy-optimizing resource/location selection 130 (or another component) may identify the resources that are both compatible with the specified workload and also available for execution of that workload (e.g., not in use for another workload or scheduled for use for another workload within a relevant window of time). From among those available and compatible computing resources, the energy-optimizing resource/location selection 130 may select the location and/or starting time of that workload in order to reduce energy usage, e.g., based on current or predicted environmental conditions (e.g., temperatures) at the data centers 160-170. For example, a placement decision for a computing resource may select a first data center 160 over a second data center 170 if the first data center 160 has a lower ambient temperature, thereby placing less of an additional burden on the cooling infrastructure 171 of the hotter data center and potentially, if the ambient temperature is cold enough, reducing use of a heating infrastructure 161 at the colder data center. As another example, the energy-optimizing resource/location selection 130 may select particular a location within a data center to reduce hotspots (in which numerous computing resources collectively produce a spike in heat) that would require greater use of the cooling infrastructure. By selecting locations for computing resources or tasks in view of environmental conditions or energy usage metrics at a set of data centers, the resource placement manager may reduce energy usage across the data centers. Reducing energy usage may improve the environmental impact of the data centers as well as the cost of operating the data centers.

Figure 2:
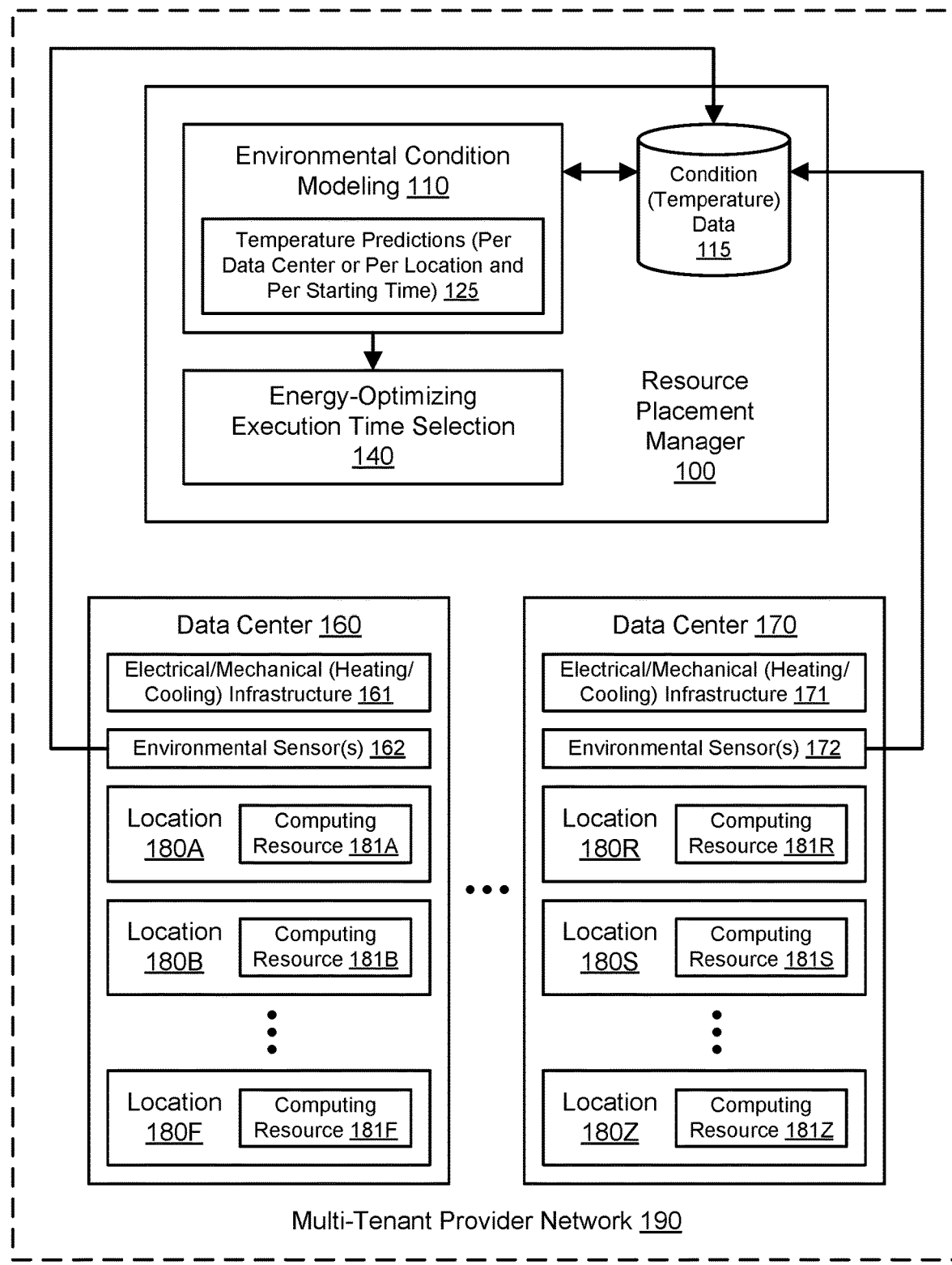
FIG. 2 illustrates further aspects of the example system environment for energy-optimizing placement of resources in data centers, including selection of execution start times to reduce energy usage, according to some embodiments.

FIG. 2 illustrates further aspects of the example system environment for energy-optimizing placement of resources in data centers, including selection of execution start times to reduce energy usage, according to some embodiments. The resource placement manager 100 may also time-shift workloads to reduce energy usage and cost. As discussed above, the resource placement manager 100 may include a component for environmental condition modeling 110. The environmental condition modeling 110 may determine a predictive model of conditions at various data centers 160-170 and at various times at which execution of a workload may be initiated. For example, the environmental condition modeling 110 may generate temperature predictions 125 per starting time of a computing task and per data center or per location within a data center.

The resource placement manager 100 may include a component for energy-optimizing execution time selection 140. In some embodiments, as shown in the example of FIG. 2, the energy-optimizing execution time selection 140 may use data (e.g., predicted temperatures 125) produced by the environmental condition modeling 110 to select execution starting times at data centers 160-170. In some embodiments, the energy-optimizing execution time selection 140 may be performed when a request is received from a customer of the provider network 190 to launch a computing resource, execute a workload, or schedule a workload. In some embodiments, the energy-optimizing execution time selection 140 may be performed when a request is received to migrate a computing resource or workload that is already being executed. In some embodiments, the energy-optimizing execution time selection 140 may be performed when sufficient conditions are detected to migrate a computing resource or workload that is already being executed. For example, if temperatures rise or drop sharply, then the resource placement manager 100 may recommend or initiate migration of workloads to optimize energy usage in light of the changing environmental conditions.

In some embodiments, the energy-optimizing execution time selection 140 may be performed for workloads that are not necessarily time-sensitive such that the workload need not be scheduled for immediate execution. For such a workload, a particular data center and/or location within a data center may be selected, e.g., to optimize energy usage as discussed herein. For a customer-specified workload (or set of one or more computing tasks) that requires one of the computing resources 181A-181Z, the energy-optimizing execution time selection 140 (or another component) may identify the resources that are both compatible with the specified workload and also available for execution of that workload (e.g., not in use for another workload or scheduled for use for another workload within a relevant window of time). The energy-optimizing execution time selection 140 may also identify available starting times for execution of the specified workload. From among the available and compatible computing resources and available starting times for those resources, the energy-optimizing resource/location selection 130 may select the location and starting time of that workload in order to reduce energy usage, e.g., based on current or predicted environmental conditions (e.g., temperatures) at the data centers 160-170. For example, the energy-optimizing execution time selection 140 may be used to schedule less time-sensitive workloads at night to reduce an additional burden of the task execution on the heating/cooling infrastructure. As another example, the energy-optimizing execution time selection 140 may be used to schedule less time-sensitive workloads after the anticipated arrival of a cold front (according to weather forecasts) to reduce an additional burden of the task execution on the heating/cooling infrastructure.

In some embodiments, the resource placement manager 100 may use a model predictive of heat generation by various workloads. The workload-based model may use historical data for the effect of various workload types on data center temperatures and other environmental conditions. For example, the workload-based model may predict a greater heat production by a GPU-intensive workload than for a network-intensive or storage-intensive workload with minimal CPU or GPU processing. Similarly, the workload-based model may predict energy usage of particular workloads, including not only the computing resource itself but also networking infrastructure and other components (e.g., storage resources at the same data center). When selecting resource locations and/or starting times to reduce energy usage, the resource placement manager 100 may take the predictive output of the workload-based model into consideration. In order to minimize the energy used by networking equipment (and the infrastructure used to cool that equipment), a workload may be assigned to a first set of resources instead of another set of resources based (at least in part) on the network topology of the selected resources. For example, a workload may be assigned to a particular resource in order to minimize the number of network hops to another resource on which the workload is dependent, thereby reducing the heat generated by networking equipment between the two resources.

The computing resources 181A-181Z may represent physical compute instances or servers that can be configured to perform a variety of computing tasks. In some embodiments, any of computing resources 181A-181Z may be implemented by the example computing device 3000 illustrated in FIG. 9. In some embodiments, virtual compute instances (including virtual machines) may be launched on computing resources selected by the resource placement manager 100. Virtual machines may represent an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances."

The provider network 190 may represent a network set up by an entity such as a company or a public-sector organization to provide one or more services (such as various types of network-accessible computing or storage) accessible via the Internet and/or other networks to a distributed set of clients. The provider network 190 may include numerous data centers 160-170 hosting various resource pools, such as collections of physical and/or virtualized computer servers or other compute resources, storage resources, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 190 in different embodiments, including general purpose or special purpose computer servers, storage devices, network devices, and the like. Because resources of the provider network 190 may be under the control of multiple clients (or tenants) concurrently or serially, the provider network may be said to offer multi-tenancy and may be termed a multi-tenant provider network.

Aspects of the provider network 190 may be hosted in the cloud, and the network may be referred to as a cloud provider network. A cloud provider network (sometimes referred to simply as a "cloud") refers to a pool of network-accessible computing resources (such as compute, storage, and networking resources, applications, and services) which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network such as a fiber communication connection. An availability zone (also known as an availability domain, or simply a "zone") refers to an isolated failure domain including one or more data center facilities with separate power, separate networking, and separate heating/cooling from those in another availability zone. Availability zones within a region may be positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and TCs may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability. In the context of the disclosed energy-optimizing resource placement techniques, customers of the cloud provider network may specify one or more regions, availability zones, and/or edge locations (or a set of edge locations that satisfy constraints of a workload, such as latency in communicating with external devices) in which jobs should be executed (or in which instances should be launched), and the placement manager 100 can determine precisely which data center, room in a data center, and/or server in a data center should be used for launching computing resources in the specified locations.

Components of the resource placement manager 100 as well as its clients and other services may convey network-based service requests to one another via one or more networks. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

In one embodiment, the resource placement manager 100 may be accessible via a command-line interface (CLI) in which textual prompts are displayed to the user, and textual responses to those prompts are received from the user. In one embodiment, the resource placement manager 100 may be accessible via a graphical user interface (GUI) in which GUI elements representing prompts are displayed to the user, and responses to those prompts (e.g., user interaction with GUI elements such as checkboxes and text entry panes) are received from the user. In one embodiment, the resource placement manager 100 may be accessible via a voice-enabled interface in which audio prompts are presented to the user, and voice responses to those prompts are received from the user. In some embodiments, the GUI and/or voice-enabled interface may be built on top of the CLI. In some embodiments, the resource placement manager 100 may offer an application programming interface (API) or other programmatic interface that permits other components to invoke the functionality of the resource placement manager, e.g., to select locations and/or times for execution of tasks. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Figure 9:
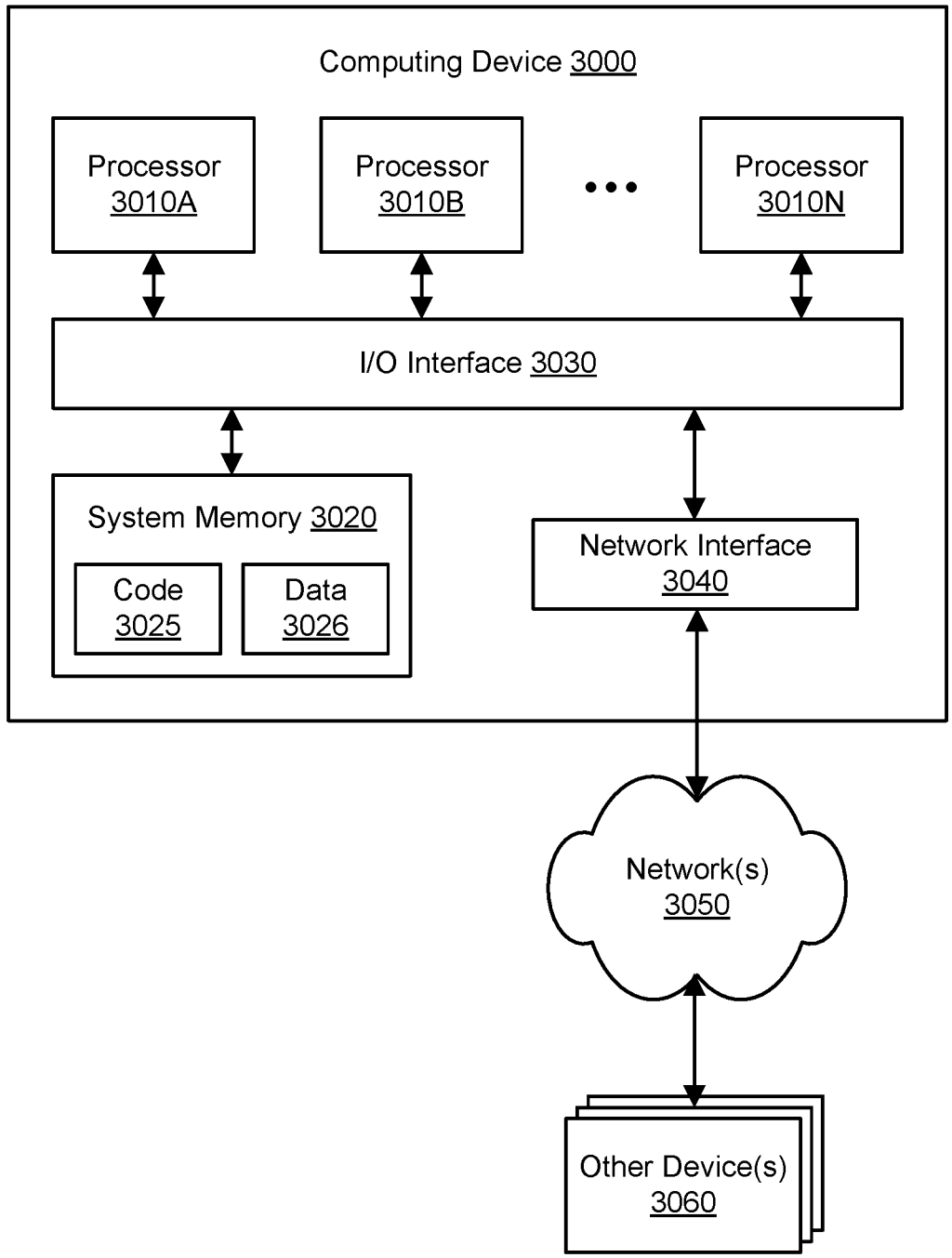
FIG. 9 illustrates an example computing device that may be used in some embodiments.

The resource placement manager 100 may be implemented using any suitable number and configuration of computing devices, any of which may be implemented by the example computing device 3000 illustrated in FIG. 9. The computing devices may be located in any suitable number of data centers or geographical locations. In various embodiments, at least some of the functionality of the resource placement manager 100 may be provided by the same computing device or by different computing devices. If any of the components of the resource placement manager 100 are implemented using different computing devices, then the components and their respective computing devices may be communicatively coupled, e.g., via one or more networks. Each of the components of the resource placement manager 100 may represent any combination of software and hardware usable to perform their respective functions, as discussed as follows. Operations implemented by the resource placement manager 100 may be performed automatically, e.g., without a need for user initiation or user intervention after an initial configuration stage, and programmatically, e.g., by execution of program instructions on at least one computing device. It is contemplated that the resource placement manager 100 may include additional components not shown, fewer components than shown, or different combinations, configurations, or quantities of the components shown.

Figure 3:
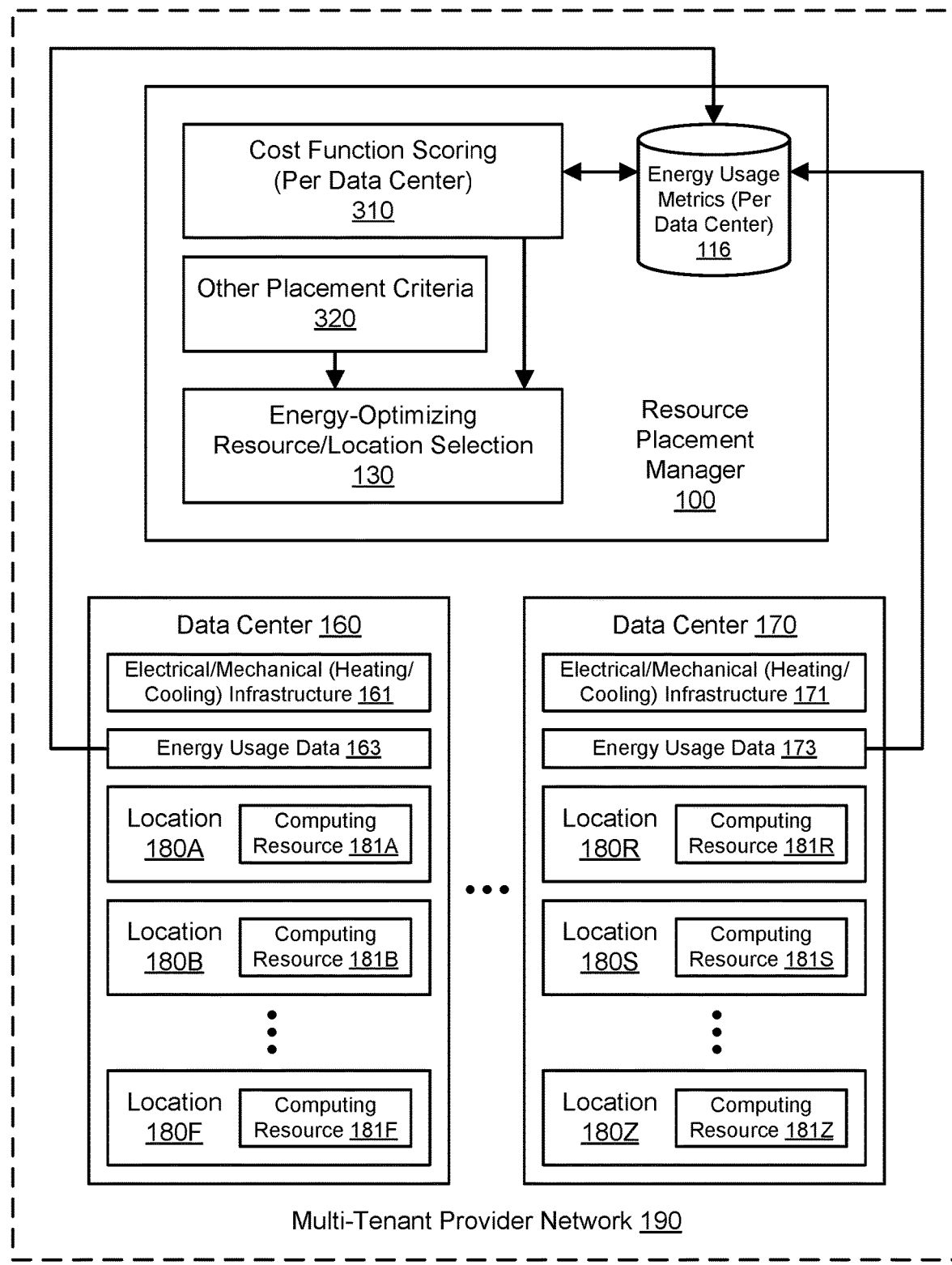
FIG. 3 illustrates further aspects of the example system environment for energy-optimizing placement of resources in data centers, including scoring resource locations according to a cost function that reduces energy usage, according to some embodiments.

FIG. 3 illustrates further aspects of the example system environment for energy-optimizing placement of resources in data centers, including scoring resource locations according to a cost function that reduces energy usage, according to some embodiments. In some embodiments, a particular type of computing resource running a particular workload may consume roughly the same amount of energy regardless of its location. However, the heat generated by that workload may need to be offset by use of the cooling infrastructure of the data center. Data centers may vary in the efficiency of their electrical/mechanical (heating/cooling) infrastructures. In some embodiments, the resource placement manager 100 may determine the placement of computing resources and/or workloads based (at least in part) on these data center infrastructure efficiencies in order to reduce energy usage.

To capture these infrastructure efficiencies, various of the data centers 160-170 may be associated with energy usage metrics 116. The energy usage metric for a data center may indicate the relative efficiency of the electrical/mechanical infrastructure of that data center. In one embodiment, the energy usage metric for a data center may be calculated by dividing the total energy usage of a data center (including the energy usage of the electrical/mechanical infrastructure) by energy usage of its computing resources and other computing-specific (e.g., information technology) equipment. The energy usage metric for a data center may capture the proportion of power consumed by servers and networking equipment versus "overhead" equipment such as generators, chillers, and fans. The energy usage metrics 116 may use energy usage data 163 associated with data center 160 and energy usage data 173 associated with data center 170. The energy usage metrics 116 can be computed at various levels of granularity, for example at the data center level as described above, for specific rooms within a data center, for electrical lineups within a data center, server racks, and/or for particular servers.

For a given resource and/or workload, the resource placement manager 100 may determine a set of candidate locations based (at least in part) on compatibility and availability. Using a component for cost function scoring 310, the resource placement manager 100 may assign scores to candidate locations according to a cost function that considers electrical/mechanical efficiencies of different data centers. In one embodiment, the cost function may be expressed as follows: $\Sigma_{day}\Sigma_{region}\Sigma_{site}$ (DailyRegionalITLoad*LoadProportion*EnergyUsage Metric*EnergyPrice), where a site represents a particular data center within a given region, the DailyRegionalITLoad represents the daily regional load of all information technology (IT) equipment (e.g., in kilowatt-hours), the LoadProportion represents the normalized daily proportion of a region's instances deployed to a given site, the EnergyUsageMetric represents a site-specific electrical/mechanical efficiency as a proportion of the total load over IT load, and the EnergyPrice represents a site-specific monthly energy price (e.g., per kilowatt-hour). In some embodiments, electrical/mechanical efficiency metrics may be used to determine that particular data centers should be deprecated or renovated. For example, if an older data center has become particularly inefficient at heating/cooling, then the owner of the provider network 190 may seek to upgrade the electrical/mechanical infrastructure or even shut down the data center if such upgrades would prove too costly.

The scores produced by the cost function scoring 310 may be used with other criteria 320 by the energy-optimizing resource/location selection 130 to determine placement. Because criteria 320 other than energy usage may also be used to determine placement of computing resources and tasks, energy usage may be improved by use of the resource placement manager 100 but may not necessarily be reduced to "optimal" or "ideal" levels. The other placement criteria 320 may include customer-specified criteria. For example, the other placement criteria 320 may include customer preferences about placement, e.g., a preference for particular data centers or for some workloads to be placed near other workloads to reduce network latency between the workloads. As another example, the other placement criteria 320 may include customer preferences for particular instance types offered at particular data centers and not others, where the provider network 190 offers a variety of instance types that vary in their computing capabilities, memory capabilities, storage capabilities, network capabilities, and so on.

The other placement criteria 320 may include criteria intended to improve the lifespan of one or more computing resources. For example, if a resource may prove especially expensive or difficult to replace at the end of its useful life, then the other placement criteria 320 may tend to prefer other resources that can perform the same types of tasks. As another example, workloads may be distributed across a set of resources so that the individual resources tend to depreciate at the same rate. Prolonging the lifespan of resources may also bring environmental benefits, e.g., by reducing electronic waste. Conversely, the other placement criteria 320 may include criteria intended to reach the end of the lifespan of one or more computing resources more rapidly. For example, an owner of the provider network 190 may wish to more rapidly cycle through certain types of resources (e.g., storage) for which replacements would provide superior performance or capability (e.g., storage capacity).

The other placement criteria 320 may include criteria intended to improve the performance and/or reduce the cost of workloads, e.g., by locating related workloads to reduce network latency between the workloads. In order to minimize the energy used by networking equipment (and the infrastructure used to cool that equipment), a workload may be assigned to a first set of resources instead of another set of resources based (at least in part) on the network topology of the selected resources. For example, a workload may be assigned to a particular resource in order to minimize the number of network hops to another resource on which the workload is dependent, thereby reducing the heat generated by networking equipment between the two resources.

Figure 4:
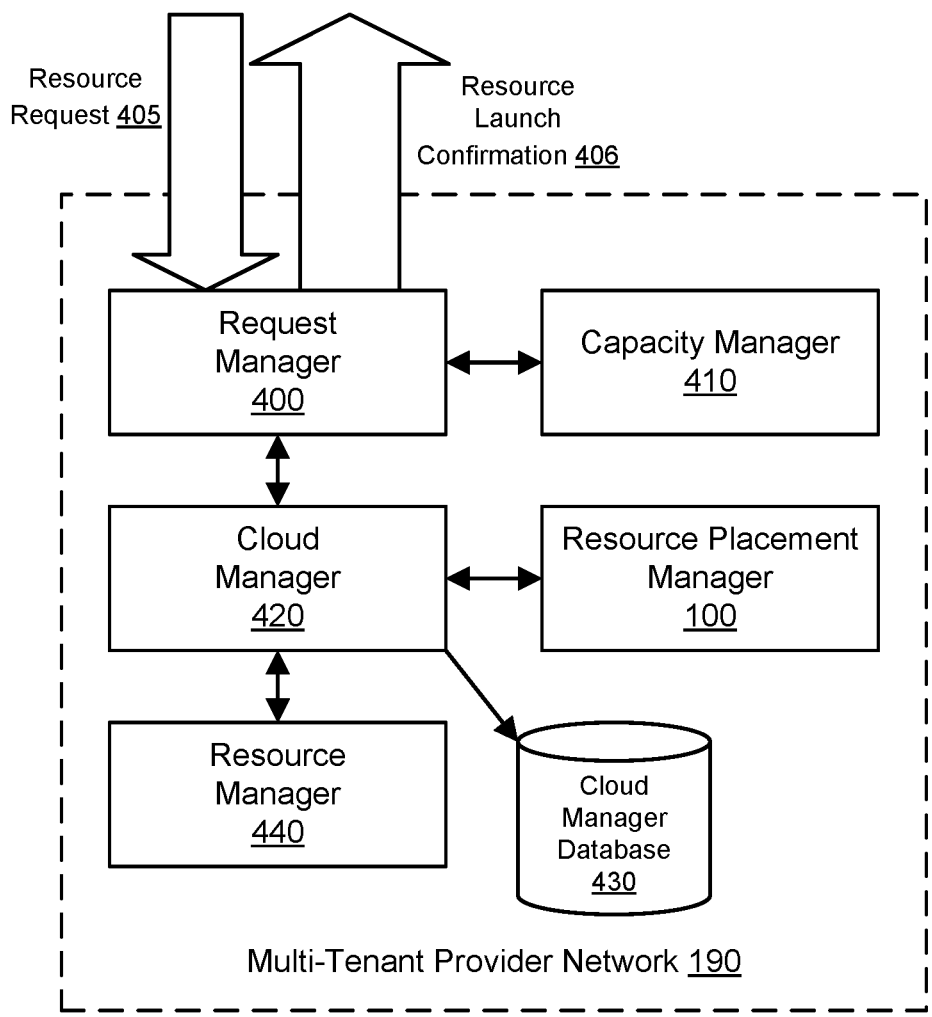
FIG. 4 illustrates further aspects of the example system environment for energy-optimizing placement of resources in data centers, including interactions in a resource launch path, according to some embodiments.

FIG. 4 illustrates further aspects of the example system environment for energy-optimizing placement of resources in data centers, including interactions in a resource launch path, according to some embodiments. A resource request 405 may be received by a request manager 400. The resource request 405 may ask that the cloud provider provision a specific type of resource such as a virtual machine instance (referred to in various implementations as a virtual machine or instance), container, serverless function (for which the user provides code to be executed but does not manage underlying infrastructure, instead having that infrastructure managed by the cloud provider), block storage volume, file store, object store, or other type of virtualized computing resource that will require the use of underlying physical infrastructure. In general, a volume (referred to in various implementations as a cloud disk, storage disk, cloud volume, disk, or block volume) can correspond to a logical collection of data, such as a set of data maintained on behalf of a user. The data of the volume may be replicated between multiple devices within a distributed computing system, in order to provide multiple replicas of the volume (where such replicas may collectively represent the volume on the computing system). A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. In some implementations, the resource request 405 may ask that the cloud provider provision a set of such resources as needed for a particular workload or application.

The resource request 405 may be provided by a customer of the provider network 190 (either directly, or indirectly through some other component) and may be associated with customer preferences for location, customer preferences for instance types or resource types, an indication of a workload type to be executed on the instance, and/or other relevant characteristics. The resource request 405 may be authenticated, authorized, logged, audited, and/or throttled by the request manager 400. If the request is not invalidated, the request manage 400 may route it to a capacity manager 410 that is responsible for balancing capacity pools and recommending when to add new resources. The capacity manager 410 may determine whether the customer is hitting any limits to prevent any APIs from being overwhelmed.

The request manager 410 may then pass the request 405 to a cloud manager 420. The cloud manager 420 may centralize resource activities within the provider network 190. The cloud manager 420 may manage the computing resources within a zone, e.g., by taking responsibility for launching and terminating the resources. In some embodiments, the cloud manager 420 may include one or more manager of various types such as a regional (read/write-capable) cloud manager that handles all mutating requests, a read-only cloud manager that handles immutable requests, and a local cloud manager that handles requests from a resource (droplet) manager 440. The cloud manager 420 may store resource data associated with the request 405 using a cloud manager database 430. The cloud manager 420 may return a pending state to the customer and ask the resource placement manager 100 to select a location (e.g., a droplet).

The resource placement manager 100 may maintain an in-memory view of the resources (e.g., droplets) within the zone. When a resource is to be launched, the resource placement manager 100 may select a location (e.g., which droplet) for the resource based (at least in part) on the energy-optimizing criteria discussed herein. The resource placement manager 100 may receive a request from the cloud manager 420 that indicates a desired resource (droplet) class. The resource placement manager 100 may attempt to spread resources across locations (e.g., racks and droplets) to decrease the chance of failure and also to reduce energy costs by eliminating hotspots. The resource placement manager 100 may return a selected location ID or droplet ID to the cloud manager 420. The cloud manager 420 may then send a request to a resource (droplet) manager 440 to coordinate launching of the resource. The cloud manager 420 may send a confirmation 406 of the resource launch to the customer.

Figure 5:
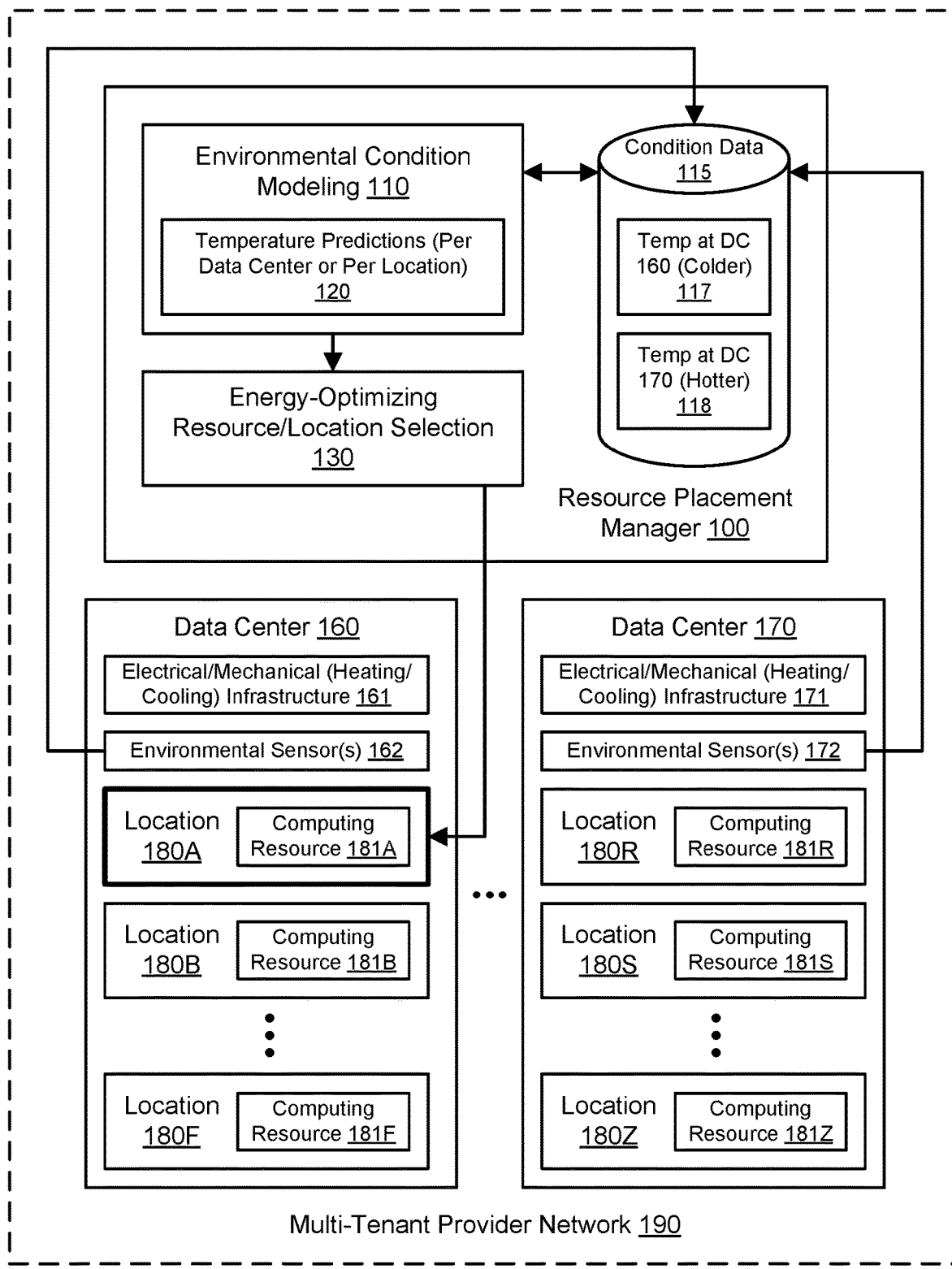
FIG. 5 illustrates further aspects of the example system environment for energy-optimizing placement of resources in data centers, including an example of resource placement in a colder data center instead of a warmer one to reduce energy usage associated with heating/cooling, according to some embodiments.

FIG. 5 illustrates further aspects of the example system environment for energy-optimizing placement of resources in data centers, including an example of resource placement in a colder data center instead of a warmer one to reduce energy usage associated with heating/cooling, according to some embodiments. In the example of FIG. 5, the condition data 115 may include a recent or current temperature 117 at the data center 160 and a recent or current temperature 118 at the data center 170. The temperatures 117-118 may indicate that the data center 160 is colder and the data center 170 is hotter. A placement decision for a computing resource may select the data center 160 over the data center 170 based (at least in part) on the data center 160 being colder. For example, the placement manager 100 may select resource 181A in available location 180A. Such a placement decision may place less of additional burden on the cooling infrastructure 171 of the hotter data center. If the ambient temperature at the data center 160 is cold enough, the placement decision may require less use of the heating infrastructure 161 at the colder data center. By prioritizing placement in the colder data center, the placement decision may reduce energy usage across the data centers 160-170.

Figure 6:
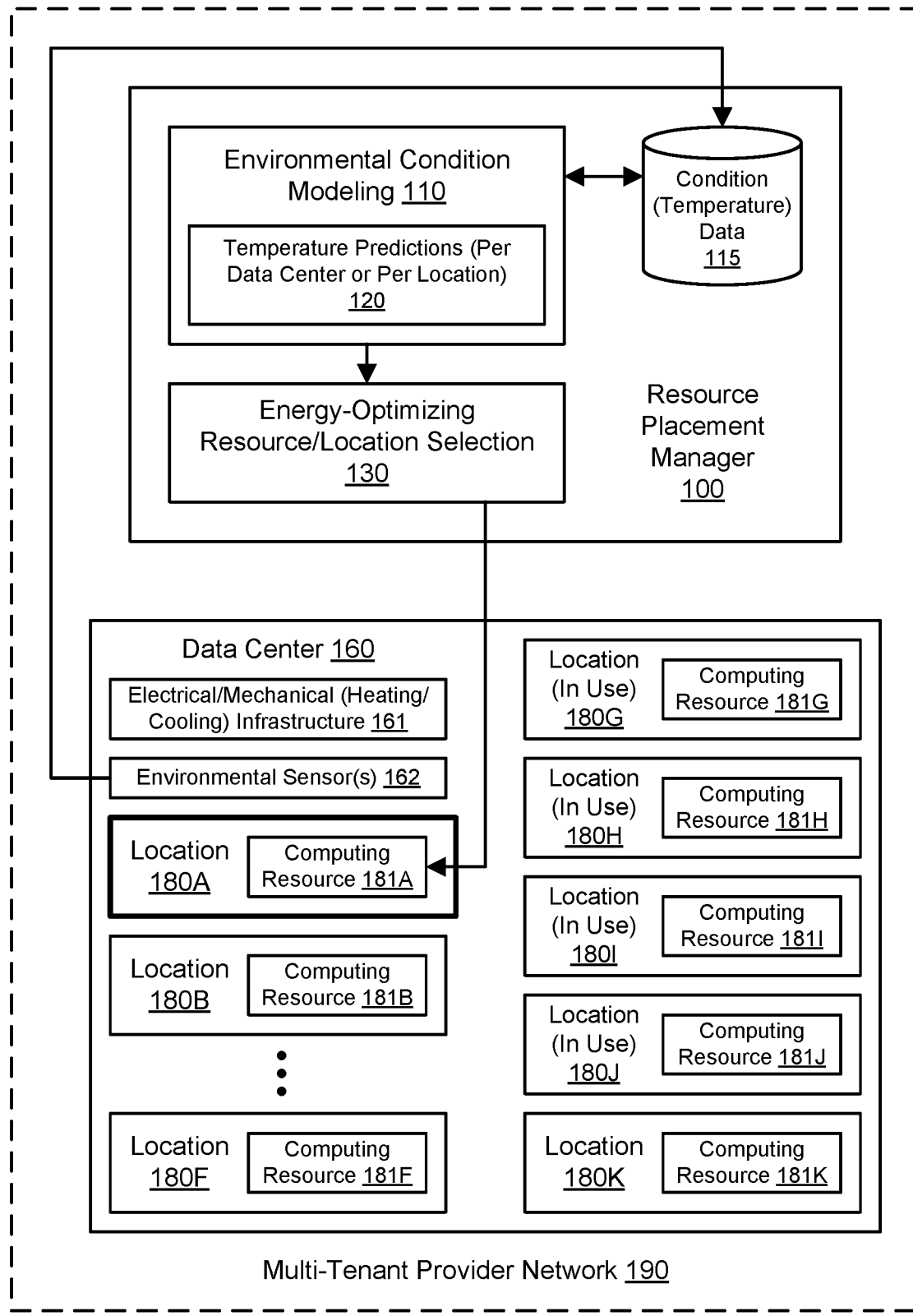
FIG. 6 illustrates further aspects of the example system environment for energy-optimizing placement of resources in data centers, including an example of resource placement within a data center to reduce energy usage associated with cooling hotspots, according to some embodiments.

FIG. 6 illustrates further aspects of the example system environment for energy-optimizing placement of resources in data centers, including an example of resource placement within a data center to reduce energy usage associated with cooling hotspots, according to some embodiments. The energy-optimizing resource/location selection 130 may select particular a location within a data center to reduce hotspots that would require greater use of the cooling infrastructure. A hotspot may include a local temperature spike resulting from an accumulation of excessive heat from a set of computing resources that are positioned close to one another. A hostpot may require additional and less efficient use of the cooling infrastructure 161. In the example of FIG. 6, data center 160 includes a potential hotspot from neighboring locations 180G, 180H, 180I, and 180J that are in use by computing resources 181G, 181H, 181I, and 181J. The placement manager 100 could select the computing resource 181K in the nearby location 180K for an additional workload. However, such a placement decision could contribute to the potential hotspot of locations 180G, 180H, 180I, and 180J. The placement manager 100 may instead select resource 181A in available location 180A in a different part of the data center to spread the heat across different areas of the data center 160. By prioritizing placement in the colder location within the data center 160, the placement decision may reduce energy usage for the data center.

Figure 7:
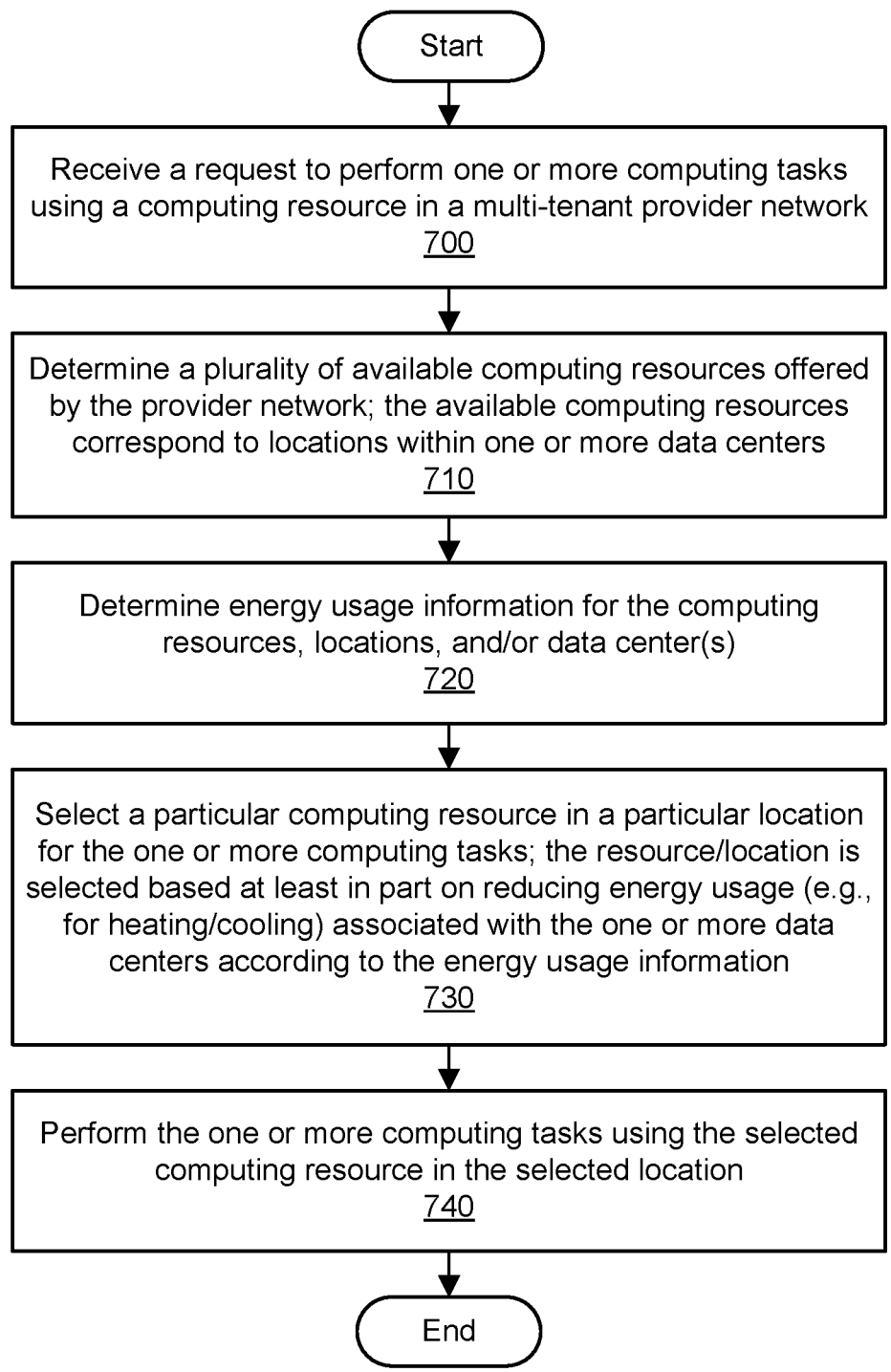
FIG. 7 is a flowchart illustrating a method for energy-optimizing placement of resources in data centers, according to some embodiments.

FIG. 7 is a flowchart illustrating a method for energy-optimizing placement of resources in data centers, according to some embodiments. As shown in 700, a request may be received to perform one or more computing tasks using a computing resource in a multi-tenant provider network. The request may seek to launch an instance or migrate an existing instance. The request may be received from a customer of the provider network. As shown in 710, the method may determine a plurality of available computing resources offered by the provider network. The computing resources may correspond to different locations within one or more data centers. The available computing resources may be compatible with the request and may be termed candidate resources. A placement decision that reduces energy usage may select one resource (and its corresponding location) from this set of candidate resources.

As shown in 720, the method may determine energy usage information for the computing resources, locations, and/or data center(s). In some embodiments, environmental sensors at data centers may provide current readings for temperature, humidity, and so on at one or more locations within a given data center, and these values may be maintained by a resource placement manager and used in placement decisions. Environmental condition modeling may determine a predictive model of conditions at various data centers and at various times. For example, the environmental condition modeling may generate temperature predictions per data center or per location within a data center. A temperature prediction for an entire data center may include the same temperature prediction for every location within that data center, or location-specific temperature predictions may be provided. In some embodiments, the energy usage information may include per-data-center scores according to a cost function. The cost function may reflect the relative efficiencies of the electrical/mechanical (heating/cooling) infrastructures of various data centers.

As shown in 730, based at least in part on the energy usage information (e.g., temperatures predicted by a model), the method may select a particular computing resource in a particular location for execution of the one or more computing tasks. The resource and location may be selected based at least in part on reducing energy usage associated with heating or cooling the data center(s). As shown in 740, the one or more computing tasks may be performed using the selected computing resource in the selected location. As a consequence of the energy-optimizing placement decision in 730, use of the resource may contribute less to the energy usage of the data center(s) than in the absence of the energy-optimizing placement decision.

Instance Type Optimization Using Infrastructure Usage Data

Figure 8:
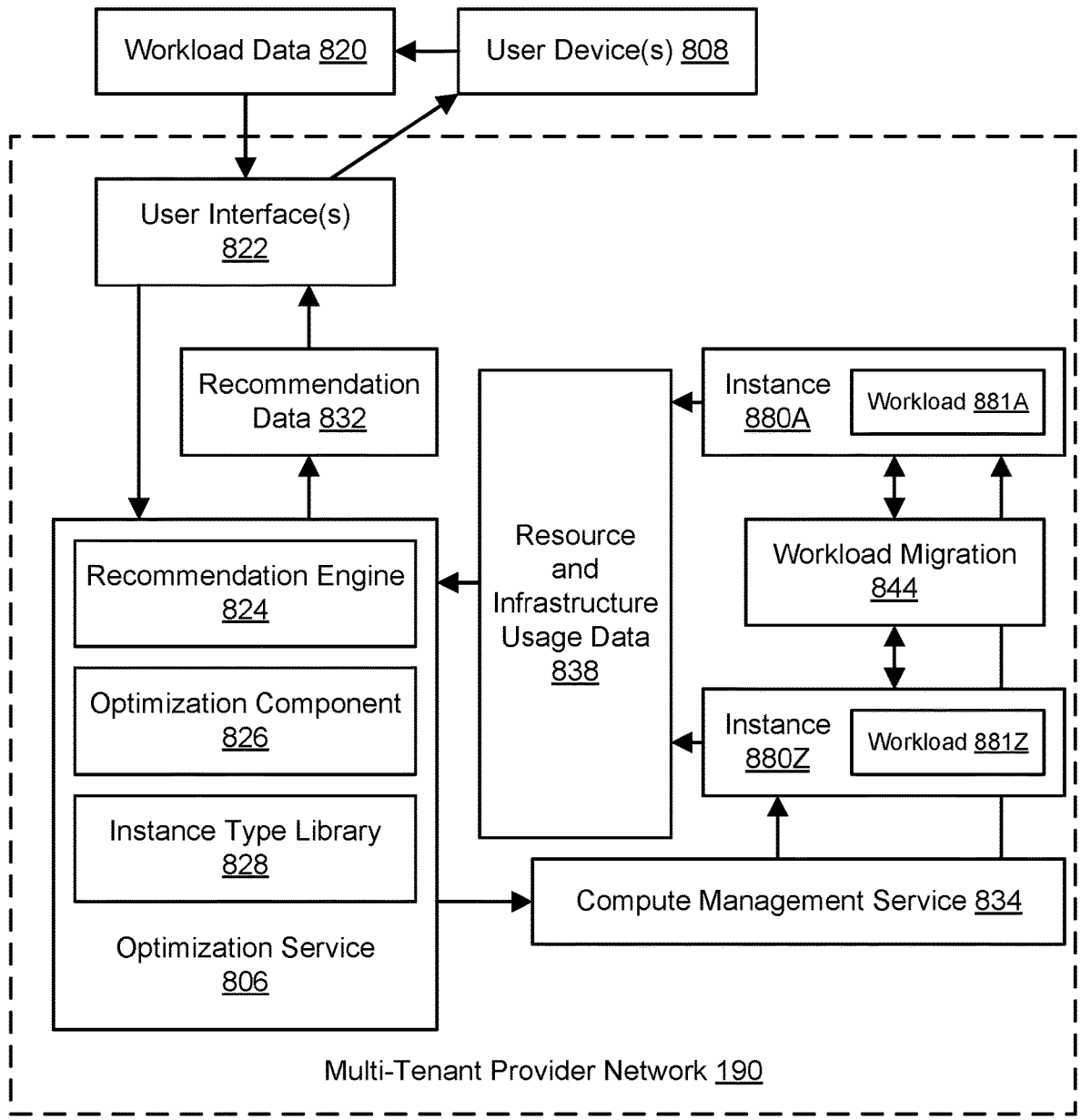
FIG. 8 illustrates a system for determining optimal compute instance types using infrastructure usage data, according to some embodiments.

FIG. 8 illustrates a system for determining optimal compute instance types using infrastructure usage data, according to some embodiments. In some embodiments, different types of workloads may be associated with corresponding usage profiles. A usage profile may indicate an expected range of metrics for the workload. For example, a CPU-intensive workload may have a higher range of expected CPU utilization than a GPU-intensive workload, and vice versa. In some embodiments, metrics 838 associated with processor utilization, memory utilization, storage utilization, and/or network utilization at instances (e.g., instance 880A running workload 881A and instance 880Z running workload 881Z) may be used to provide feedback to an instance optimization service 806. For example, if the CPU utilization data is unexpectedly high in comparison to the usage profile for the workload type, then the original instance recommendation may be deemed suboptimal. A new instance recommendation may be generated by the optimization service 806 in view of the additional usage data, e.g., to recommend an instance type with a greater number of cores or more powerful cores.

A usage profile may also indicate the expected heat generation or other infrastructure-utilization characteristics of the workload type. For example, a GPU-intensive workload may have a different usage profile in terms of heat generation than a workload that is not GPU-intensive. In some embodiments, infrastructure usage data 838, such as data produced by the environmental sensors 162 and 172 (e.g., temperature values), may be used to provide feedback to the optimized instance recommendations by the optimization service 806. Current temperature data for a particular location may be received from a data center and associated with the workload being executed in that location. If the temperature is unexpectedly high in comparison to the usage profile for the workload type, then the original instance recommendation may be deemed suboptimal. A new instance recommendation may be generated in view of the additional usage data, e.g., to recommend an instance type that is expected to produce less heat in executing the given workload.

As discussed above, the provider network 190 may utilize virtualization technologies such that the computing devices 181A-181Z can each host multiple virtual machine (VM) instances that appear and operate as independent computing devices to support workloads of users. Rather than allocating all of the computing resources of a physical computing device to support a single workload for a user, the computing resources of a physical computing device can be allocated amongst multiple VM instances that support different workloads. The provider network 190 supports many different types of workloads on behalf of users, and these workloads often have different computing resource needs. As described herein, a workload is implemented by a designated set of computing resources and the workload itself can be considered as code or logic that performs functionality using the computing resources. The provider network 190 may support a wide variety of workloads, such as web servers, databases, customer-facing applications, distributed data stores, batch processing, machine/deep learning training and/or inference, online gaming, video encoding, memory caching, and/or any other type of workload that can be supported by computing resources of a provider network 190.

In light of the different workloads that are supported on behalf of users, the provider network 190 may provide users with a selection of a variety of VM instance types optimized to support different workloads. Generally, each VM instance type may be allocated a different amount of computing resources, and/or different combination of computing resources, such that the VM instance types are optimized, or computationally biased, to support different workloads. Computing resources may refer to compute, memory, storage, networking, and, in some implementations, graphics processing. As an example, one VM instance type may be allocated a larger amount of compute (e.g., processor cycles) and be optimized to support compute-heavy workloads, whereas another VM instance type may be allocated a larger amount of storage (e.g., disk space) and be optimized to support storage-intensive workloads. In this way, users can select a VM instance type or platform that is more optimized to support their workload, thereby increasing the performance of the workload while reducing underutilization of computing resources by the provider network 190. Instance types and their characteristics may be represented in an instance type library 828 for selection of optimal instance types for particular workloads.

Generally, an increase in the complexity and diversity of VM instance types offered by the provider network 190 is advantageous and results in a higher likelihood that workloads are supported by a more optimized VM instance. While a large variety of VM instance types is advantageous for various reasons (e.g., efficient utilization of computing resources, high performance for workloads, etc.), it also may become difficult for users, particularly new users, to select a suitable or appropriate VM instance type to support their workload(s). For example, users may attempt to map out the computing resource needs of their workload and then peruse the offering of VM instance types to locate a VM instance type that seems appropriate for their needs. In other examples, users may go through a time-consuming trial-and-error process to analyze performance of their workloads using different VM instance types. However, not only is this time consuming, but it may also result in users having their workloads hosted on VM instance types that are either overutilized and resource constrained, or underutilized and resulting in computing resources that may be unused and sitting idle. As an example, users may be overly cautious and select an oversized VM instance type to help ensure that their workloads are never resource constrained, which may result in low utilization of computing resources of the provider network 190.

In some embodiments, an optimization service 806 of a provider network 190 may help optimize the selection, configuration, and utilization of VM instance types to support workloads on behalf of users. The optimization service 806 may implement techniques at various stages in a life cycle of a workload to help optimize the performance of the workload and reduce underutilization of computing resources. For example, the optimization service 806 may perform techniques to help new users select an optimized VM instance type on which to initially launch their workload. Further, the optimization service 806 may be configured to monitor a workload for the life of the workload, and determine different VM instance types, and/or different configuration modifications, that optimize the performance of the workload. In this way, the optimization service 806 may provide recommendations to users that help improve performance of their workloads, and that also increase the aggregate utilization of computing resources of the provider network 190.

The optimization service 806 may perform techniques to help new users select a VM instance type that is optimized to host or support their workload. Often new users may be unsophisticated with respect to computing resources and/or unfamiliar with certain terminology. Accordingly, the optimization service 806 may deliver a managed experience, such as a step-by-step process, that allows new users to describe their workload using language and terminology that the new user understands, and then provides the user with recommendations for VM instance type(s) optimized for their workload. In some examples, the optimization service 806 may include a wizard that is accessible to a new user via their user account and presents user interface(s) 822 to the user via one or more user computing devices 808. The user interface(s) 822 are configured to receive input data that defines that user's workload. The wizard may present user interface(s) 822 that include text-input fields to receive a textual description of a workload from a user, or fields with a drop-down menu that include answers for a question regarding the workload of the user, such that a user can answer high-level questions about their workloads. For example, the wizard may present the user with questions such as "is your workload a publicly facing website," or "how many visitors do you expect per day?". The optimization service 806 may use the input received from the user to classify the workload as belonging to a predefined workload category (e.g., web-server category, database category, compute-heavy category, etc.), and provide the user account with a listing of recommended VM instance types to support their workload. The listing may further include explanations regarding why the VM instance types are optimized for their workload to enable the user to make a more informed decision regarding what instance type they should select. The user may then select a VM instance type to support their workload, and the optimization service 806 may perform further techniques for launching one or more VM instances of the selected type to support the workload on behalf of the user account. Thus, the optimization service 806 may be configured to identify and recommend VM instance types for new workloads and/or new users.

Additionally, the optimization service 806 may be further configured to help optimize the performance of the workload for the life of the workload. In some instances, and regardless of whether the optimization service 806 previously identified and/or recommended VM instance types for new workloads or new users, the optimization service 806 may determine that the workload would be better suited on a different VM instance type. For example, the workload may have changed over time (e.g., software update, new features, increase in user traffic, etc.) that in turn results in different resource-consumption or infrastructure (heating/cooling) consumption characteristics of the workload. In light of such modifications or changes, the optimization service 806 may continually, or periodically, analyze the resource and infrastructure usage characteristics 838 of the workload and determine if resource or heating/cooling infrastructure consumption has changed significantly enough such that a new VM instance type is more appropriate for the workload than the current VM instance type. In other examples, the provider network 190 may develop and offer new VM instance type(s) to increase the offerings of VM instance types for users. An optimization component 826 of the optimization service 806 may use various techniques, such as workload simulation, to determine that the new VM instance type is more optimized for the workload (or workload category to which the workload belongs) than the currently utilized VM instance type. For such reasons, and potentially other reasons, the optimization service 806 may provide the user account with recommendations 832 that the user perform workload migration 844 from the current VM instance type to be hosted by a different VM instance type that is more optimized for the resource consumption/utilization of the workload.

To determine a VM instance type that is optimized for a workload, the optimization service 806 may have generated a predefined set of workload categories that generally represent or group the workloads supported by the provider network 190 into categories based on the "shape" of the utilization characteristics of the workloads. The shape of utilization characteristics can refer to the amount of usage across each different compute dimension—processing, memory, storage, networking, and optionally graphics processing—which may be visualized as a plot having a number of axes corresponding to the number of compute dimensions. The plotting of utilization along each axis can result in a specific shape, for example a quadrilateral or other polygon formed by connecting the plotted points. This may be a static shape representing an average or mean utilization, a set of shapes representing minimum, maximum, average, or other statistical analyses of utilization over time, or a dynamic shape representing utilization across the compute dimensions over time. Certain utilization shapes (or ranges of similar utilization shapes) may be determined (manually or by application of suitable machine learning analysis) to represent particular types of workloads. For example, the optimization service 806 may have collected resource-utilization data for workloads that are supported by the provider network 190, and based on the resource-utilization characteristics (or "resource-consumption characteristics") of the workloads, performed techniques, such as clustering, to group the workloads into categories based on the shape of their resource utilization. To illustrate, one predefined workload category may be a "database workload category" and generally correspond to the resource-utilization characteristics for database workloads (e.g., low compute consumption, high storage consumption, etc.). Another predefined workload category may be a "compute heavy category" and generally correspond to the resource-utilization characteristics for computationally-biased workloads.

Each of the workload categories may be defined by a respective resource-utilization model that indicates that shape of the resource-utilization characteristics for the workloads represented by the workload category. The resource-utilization models may indicate amounts of the different types of resources consumed by the representative workloads (e.g., amounts of CPU, storage, memory, networking throughput, GPU, etc.), and or combinations of the different types of resources consumed by the representative workloads. Each of the workload categories may be defined by a respective heating/cooling infrastructure utilization model that indicates that shape of the infrastructure-utilization characteristics for the workloads represented by the workload category. The workload categories may further be associated with the VM instance types that are optimized for the resource-utilization characteristics of the represented workloads. In this way, when resource-utilization characteristics are obtained from a description provided by a new user, or through actual utilization data 838 throughout the life of a workload, the resource-utilization and infrastructure-utilization characteristics may be mapped to the "closest" resource-utilization model of a predefined workload category, and the associated VM instance types for that workload category may be provided as recommendations to optimize performance of the workload.

In addition to utilizing resource-utilization and infrastructure-utilization characteristics to determine an optimized VM instance type for a workload, the optimization service 806 may further take into account the performance of the underlying physical computing devices. Provider network 190 may manage large amounts of computing resources, and in some examples, it may include computing devices with hardware differences. The provider network 190 may include computing devices that have different chip set generations, different vendors, and/or different hardware architectures such that actual performance of the computing devices varies based on the hardware differences. For example, a computing device that has a chip set from a newer generation may perform better, or have more data throughput, than a computing device with a chip set from an older generation of chip sets. Thus, even if a VM instance is provided with, for example, the same number of virtual central processing units (vCPUs) when provisioned on two different computing devices, the performance for one of the VM instances hosting a workload may be better due to hardware differences (or improvements) in the physical resources of the computing devices. To help account for performance differences that result from physical hardware differences, the optimization service 806 may map utilization data back to the underlying physical computing resource that is consumed to get a performance metric for that computing device. In this way, performance metrics may be assigned to the underlying computing device on which a VM instance is provisioned to help determine an optimized VM instance type based on the computing device that is to be utilized. In an example where a workload is migrated from a less compute-performant device onto a more compute-performant device, the optimization service 806 may select a new VM instance type based in part on a ratio of the performance between the two devices. In this way, the optimization service 806 may select a new VM instance type that may not need be allocated as much compute power of the more compute-performance computing device. In some embodiments, migration 844 may be performed such that energy usage is optimized. For example, if the infrastructure usage data 838 indicates that the instance 880A is generating an unexpectedly high amount of heat for the workload 881A, then the workload may be migrated to a different instance type such as instance 880Z that may be better optimized to execute the workload without producing as great an amount of heat.

Additionally, the optimization service 806 may be configured to collect various data regarding an application stack of the workload and/or an operating system of the VM instance, and determine modifications to make to configuration parameters of the application stack and/or operating system to help optimize the performance of the workload. For example, the optimization service 806 may infer various configuration data about the workload based on utilization characteristics, such as inferring that the workload is a database based on the utilization characteristics of the workload mapping to a workload category for databases. In some instances, the optimization service 806 may, with permission from the user account, install a software agent locally to the VM instance(s) that support the workload, and collect configuration data using the software agent. The optimization service 806 may receive configuration data indicating information about the application stack and/or operating system, such as what processes are running, what binary backs the processes, what repositories those binaries are sourced from, what operating system and/or version is running, what configuration parameters are defined for the operating system, disk subsystem, database stack, etc., and/or any other configuration data. The optimization service 806 may then determine modifications for a parameter of at least one of the application stack and/or operating system to optimize performance of the workload, and provide recommendations indicating the modifications for the parameter. The user may then utilize their user account and accept or deny the proposed modifications to optimize their workload.

In addition to selecting a VM instance type that is optimized for the workload, the optimization service 806 may also intelligently place the VM instance type on a computing device based on computational biases of the VM instance types. As noted above, the different types of VM instance types 828 may have different computational biases based on the workloads they support, such as CPU biases, memory biases, network throughput biases, and so forth. Rather than placing virtual machines with similar computational biases on the same physical computing devices, the optimization service 8806 may determine complementary combinations of VM instance types based on their computational biases, and place those complementary combinations on the same servers. For example, the optimization service 806 may place a VM instance type that utilizes high CPU resources, but low memory resources, on the same computing device as another VM instance type that utilizes low CPU resources, but high memory resources. In some examples, the optimization service 806 may store indications of complementary pairs, or complementary combinations, of VM instance types that are determined to be complimentary based on the resource-utilization models of the workload categories to which the VM instance types are associated or belong. In this way, the underlying computing resources of the computing devices may be more efficiently and effectively utilized by intelligently hosting different VM instance types that are complimentary in how they utilize computing resources.

Although the workload optimization techniques described herein are described primarily with respect to determining a VM instance type for a workload, and provisioning a VM instance to support the workload, the techniques are equally applicable for any number of VM instances and/or workloads. For example, a workload may be supported by a VM instance, by multiple VM instances, and/or by a fleet of VM instances. In some examples, one or more workloads may be supported by a fleet of VM instances that are scalable to support increases and decreases in use, and may be placed behind one or more load balancing devices of the provider network 190. In such examples, the workload optimization techniques described herein may be applicable to all VM instances in a fleet that support various instances of the same workload.

To provide users more control over their workloads and VM instance types, the optimization service 806 may simply provide recommendations via user accounts to suggest that the users should consider new VM instance types and/or configuration parameters to optimize performance of their workload, including infrastructure usage and/or environmental impact concerns. However, in some examples, the optimization service 806 may be configured to automate the migration 844 of workloads to new VM instance types, and/or implementation of new configuration parameters. For example, the users may select an option, or "opt in," to give the optimization service 806 permission to automate the migration of workloads to new VM instance types.

The optimization service 806 may determine VM instance types that are more appropriately tailored, or allocated a more appropriate amount of computing resources, to support for workloads. In this way, the workload optimization techniques described herein may help prevent underutilization of computing resources of a service provider network, which reduces the amount of computing resources that are (i) allocated or reserved for VM instances, but (ii) sit idle or unused because the VM instances are oversized for the workload they support. Additionally, the workload optimization techniques may improve the performance of workloads by intelligently placing workloads on VM instance types that are computationally biases or optimized to support the workloads. The optimization service 806 may place the workloads on VM instances to help ensure that the workloads have sufficient amounts of computing resources available, of the types of computing resources needed, to help avoid over constrained VM instance types and workloads.

Although the workload optimization techniques described herein are with reference to virtual machines or VM instances and virtual machine types, in some examples, the workload optimization techniques are applicable to any type of virtual computing resource. For example, the workload optimization techniques are generally applicable to any type of virtual computing resource that is allocated underlying portions of physical computing resources and executes within a virtual machine, or independently executes on the physical computing resources. Such virtual computing resources can include a container executing on a physical resource, a virtual machine instance running one or more containers, processes, software, and/or any other executable that is allocated portions of physical computing resources.

The optimization service 806 may map the workload data 820 to at least one of the predefined workload categories in various ways. For instance, the workload data 820 may include one or more words that describe the resource-utilization data of the workload, such as "web server," "database," "compute heavy," and so forth. In some examples, the optimization service may simply map actual utilization data of the workload to a workload category in instances where the user is migrating the workload from a remote computing-resource network onto the provider network 190. After the optimization service 806 maps the workload data 820 to one of the predefined workload categories, the recommendation engine 824 may provide recommendation data 832 to the user device(s) 808 that includes at least a recommendation of a VM instance type that is optimized to support their workload.

The recommendation engine 824 may determine one or more of the VM instance types associated with the workload category, and may further rank the VM instance types based on how strongly the workload data corresponds to one of the VM instance types for that workload category. Depending on the size (e.g., amount of resources), and/or the combination of computing resources, for the workload, the recommendation engine 824 may provide a ranked listing of VM instance types from the instance type library 828 that are recommended for the workload data. In some examples, the recommendation engine 824 may further provide suitability data that indicates how suitable the recommended VM instance types are for supporting the workload, such as indicating a number of stars out of five stars, percentages indicating how suitable out of one-hundred percent, and/or any other suitability score or indicator. Further, the recommendation engine 824 may provide a textual explanation regarding why the VM instance types are optimized to support the workload and/or provide improved energy usage such that the user may make a more intelligent decision as to which of the VM instance types they would like to launch their workload on. The VM instance recommendations may be presented in a dashboard accessible via the user interface(s) 822, and the user may select the VM instance type on which they would like to launch their workload.

The optimization service 806 may receive input data indicating a selection of a recommended VM instance type, and provide a compute management service 834 an instruction to launch the workload on one or more (e.g., a fleet) of VM instances that correspond to the VM instance type that the user selected. In some examples, the workload may include code provided by the user, and/or generated by the provider network 190, to implement functionality of the desired workload. For example, the provider network 190 may provide services that generate code for the workload, including an application stack and/or other programs, to implement the workload. The workload may be supported by one VM instance, and/or a fleet of VM instances. In some examples, one or multiple VM instances in a fleet of VM instances may support respective workloads on behalf of the user account of the user. The compute management service 834 may further deploy one or more load balancers in front of the fleet of VM instances to scale the workload(s), and other configurations or devices (e.g., security groups) to support the workload. In this way, the optimization service 806 may help a user select, configure, and utilize a VM instance type that is optimized to support a new workload for the user's account.

In some examples, the optimization service 806 may further monitor the workload for the life of the workload, and provide additional recommendation data 832 upon detecting events that result in a different VM instance type being more optimized to support the workload than the current VM instance type to which the VM instance corresponds. For instance, the user may provide an indication to the optimization service 806 that the workload has undergone a configuration change (e.g., update, software change, traffic change, etc.) that will likely result in a change in the resource-utilization characteristics of the workload. In other examples, the optimization service 806 may periodically, or continuously, collect resource and infrastructure utilization data 838 from the VM instance that indicates a change in the resource or infrastructure utilization characteristics of the workload.

In light of such modifications or changes, the optimization service 806 may continually, or periodically, analyze the resource and infrastructure utilization data 838 of the workload and determine if resource or infrastructure consumption has changed such that a new VM instance type is more appropriate for the workload than the current VM instance type. In other examples, the service provider may develop and offer new VM instance type(s) to increase the offerings of VM instance types for users. An optimization component 826 may use various techniques, such as workload simulation, to determine that the new VM instance type is more optimized for the workload (or workload category to which the workload belongs) than the currently utilized VM instance type. For such reasons, and potentially other reasons, the optimization service 806 may provide the user account of the user with additional recommendation data 832 that includes a recommendation for the user migrate their workload from the current VM instance type to be hosted by a different VM instance type that is more optimized for the resource consumption/utilization of the workload. In such examples, the optimization service 806 may provide an instruction to the compute management service 834 to perform migration 844 of the workload to be hosted on one or more VM instances that correspond to the VM instance type that was determined to be more optimized for the workload.

Illustrative Computer System

In at least some embodiments, a computer system that implements a portion or all of one or more of the technologies described herein may include a computer system that includes or is configured to access one or more computer-readable media. FIG. 9 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 9 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method, comprising:
    determining, by a resource placement manager based at least in part on seasonal weather considerations, information descriptive of predicted energy usage by one or more data centers predicted for a future time, wherein the one or more data centers comprise a plurality of computing resources in a plurality of corresponding locations; and
    selecting, by the resource placement manager from the plurality of computing resources in the plurality of corresponding locations, a particular computing resource in a particular location at the one or more data centers for performing one or more computing tasks, wherein the particular computing resource in the particular location is selected based at least in part on reducing energy usage, associated with the one or more data centers, according to (1) the information descriptive of predicted energy usage predicted for the future time at the one or more data centers and (2) a predicted energy usage to perform the one or more computing tasks using the selected particular computing resource at the one or more data centers, and wherein the particular computing resource in the particular location is used to perform the one or more computing tasks.

2. The method as recited in claim 1, wherein a particular data center of the one or more data centers comprises the particular location, wherein the particular data center is associated with a lower ambient temperature than one or more other data centers, wherein the one or more computing tasks are anticipated to generate heat, and wherein selecting the particular computing resource in the particular location comprises selecting the particular data center over the one or more other data centers based at least in part on the lower ambient temperature of the particular data center.

3. The method as recited in claim 1, wherein the one or more computing tasks are anticipated to generate heat, and wherein selecting the particular computing resource in the particular location comprises selecting the particular location over one or more other locations within a particular one of the data centers based at least in part on reducing hotspots within the particular one of the data centers and based at least in part on reducing energy usage associated with cooling the particular one of the data centers.

4. The method as recited in claim 1, further comprising:
    determining a model predictive of environmental conditions for the one or more data centers, wherein the model predictive of environmental conditions is usable to predict one or more temperatures at one or more of the locations within the one or more data centers at one or more future times.

5. The method as recited in claim 4, further comprising:
    selecting, by the resource placement manager, a starting time for performing the one or more computing tasks, wherein the starting time is selected based at least in part on reducing the energy usage associated with the one or more data centers according to the model predictive of environmental conditions.

6. The method as recited in claim 1, further comprising:
    determining a model predictive of heat generation by the one or more computing tasks using individual ones of the computing resources, wherein the particular computing resource in the particular location is selected based at least in part on reducing energy usage associated with heating or cooling the one or more data centers according to the model predictive of heat generation.

7. The method as recited in claim 1, further comprising:
    determining a model predictive of energy usage by the one or more computing tasks using individual ones of the computing resources, wherein the particular computing resource in the particular location is selected based at least in part on reducing the energy usage associated with the one or more data centers according to the model predictive of energy usage.

8. The method as recited in claim 1, wherein a particular data center of the one or more data centers comprises the particular location, wherein the particular data center is associated with a more efficient energy usage metric than one or more other data centers, wherein the energy usage metric represents a proportion of energy consumption by computing resources to energy consumption by overhead equipment, and wherein selecting the particular computing resource in the particular location comprises selecting the particular data center over the one or more other data centers based at least in part on the more efficient energy usage metric of the particular data center.

9. The method as recited in claim 1, wherein the one or more computing tasks are migrated to the particular computing resource in the particular location to reduce energy usage associated with the one or more computing tasks.

10. A system, comprising:
    one or more processors and one or more memories to store computer-executable instructions that, when executed, cause the one or more processors to:
        determine a model predictive of environmental conditions for one or more data centers in a multi-tenant provider network, wherein the one or more data centers comprise a plurality of computing resources in a plurality of corresponding locations, and wherein the model predictive of environmental conditions is usable to predict, based at least in part on seasonal weather considerations, an ambient temperature at a location within the one or more data centers for a future time;
        select, from the plurality of computing resources in the plurality of corresponding locations, a particular computing resource in a particular location for performing one or more computing tasks, wherein the one or more computing tasks are anticipated to generate heat, and wherein the particular computing resource in the particular location is selected based at least in part on the predicted ambient temperature using the determined model at the particular location at the future time, and also based at least in part on predicted heat generated due to the performance of the one or more computing tasks at the particular location; and use the selected particular computing resource in the particular location to perform the one or more computing tasks.

11. The system as recited in claim 10, wherein a particular data center of the one or more data centers comprises the particular location, wherein the particular data center is associated with a lower ambient temperature than one or more other data centers, and wherein the particular data center is selected over the one or more other data centers based at least in part on the lower ambient temperature of the particular data center.

12. The system as recited in claim 10, wherein the particular location is selected over one or more other locations within a particular one of the data centers based at least in part on reducing hotspots within the particular one of the data centers and based at least in part on reducing energy usage associated with cooling the particular one of the data centers.

13. The system as recited in claim 10, wherein the one or more memories store additional computer-executable instructions that, when executed, cause the one or more processors to:

select a starting time for performing the one or more computing tasks, wherein the starting time is selected based at least in part on reducing the energy usage associated with heating or cooling the one or more data centers according to the model predictive of environmental conditions.

14. One or more non-transitory computer-readable storage media storing program instructions that, when executed on or across one or more processors, perform:

determining a model predictive of environmental conditions for one or more data centers based at least in part on seasonal weather considerations, wherein the one or more data centers comprise a plurality of computing resources in a plurality of corresponding locations, and wherein the model predictive of environmental conditions is usable to predict ambient temperature at a location within one of the one or more data centers for a future time;

selecting, from the plurality of computing resources in the plurality of corresponding locations, a particular computing resource in a particular location for performing one or more computing tasks; and selecting a starting time for performing the one or more computing tasks, wherein the starting time is selected based at least in part on reducing energy usage associated with the one or more data centers according to the model predictive of environmental conditions including the ambient temperature predicted for the future time, and wherein the particular computing resource in the particular location is used to perform the one or more computing tasks.

15. The one or more non-transitory computer-readable storage media as recited in claim 14, wherein the starting time is associated with a lower ambient temperature than one or more other starting times, wherein the one or more computing tasks are anticipated to generate heat, and wherein the starting time is selected based at least in part on the lower ambient temperature.

16. The one or more non-transitory computer-readable storage media as recited in claim 14, wherein the one or more computing tasks are anticipated to generate heat, and wherein the starting time is selected based at least in part on reducing hotspots within the particular one of the data centers and based at least in part on reducing energy usage associated with cooling the particular one of the data centers.

17. The one or more non-transitory computer-readable storage media as recited in claim 14, further comprising additional program instructions that, when executed on or across the one or more processors, perform:

determining a model predictive of energy usage by the one or more computing tasks using individual ones of the computing resources and one or more elements of a networking infrastructure, wherein the particular computing resource in the particular location is selected based at least in part on reducing energy usage associated with heating or cooling the individual ones of the computing resources and the one or more elements of the networking infrastructure according to the model predictive of energy usage.

18. The one or more non-transitory computer-readable storage media as recited in claim 14, wherein the particular computing resource in the particular location is selected based at least in part on prolonging the lifespan of one or more other computing resources.

19. The one or more non-transitory computer-readable storage media as recited in claim 14, wherein a particular data center of the one or more data centers comprises the particular location, wherein the particular data center is associated with a more efficient energy usage metric than one or more other data centers, wherein the energy usage metric represents a ratio of power consumption by computing resources to power consumption by overhead equipment, and wherein selecting the particular computing resource in the particular location comprises selecting the particular data center over the one or more other data centers based at least in part on the more efficient energy usage metric of the particular data center.

20. The one or more non-transitory computer-readable storage media as recited in claim 14, wherein a particular data center of the one or more data centers comprises the particular location, wherein the particular data center is associated with a lower ambient temperature than one or more other data centers, wherein the one or more computing tasks are anticipated to generate heat, and wherein selecting the particular computing resource in the particular location comprises selecting the particular data center over the one or more other data centers based at least in part on the lower ambient temperature of the particular data center.

* * * * *